March 3, 1970               A. EISELE               3,497,961
RETRACTABLE DUAL-MEASUREMENT SINGLE-INDICATOR
GAUGE FOR VARIABLE-WIDTH INTERNAL GROOVES
Filed May 2, 1968                               3 Sheets-Sheet 1
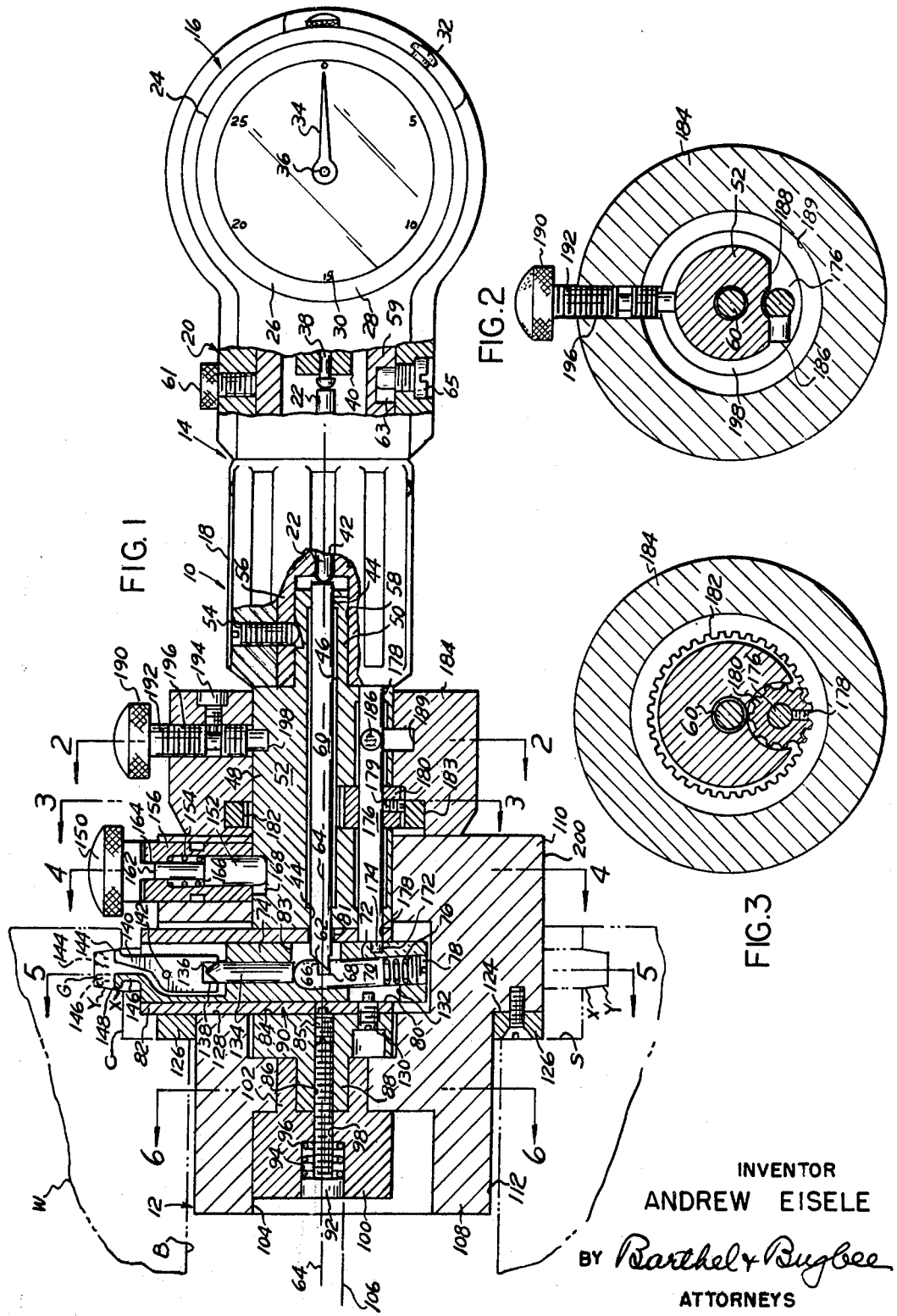
INVENTOR
ANDREW EISELE
BY Barthel & Bugbee
ATTORNEYS

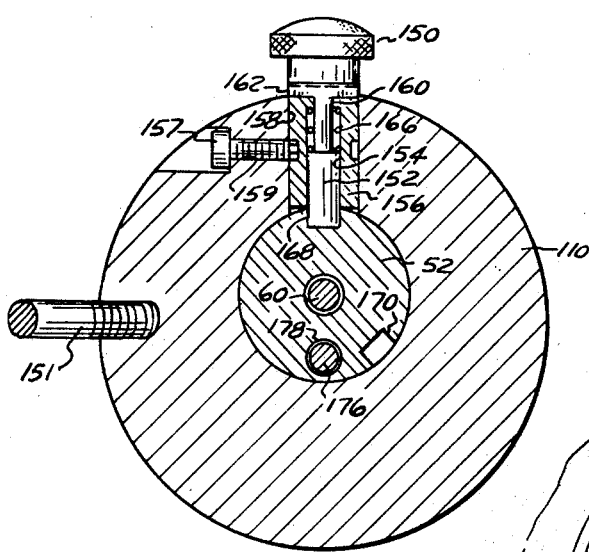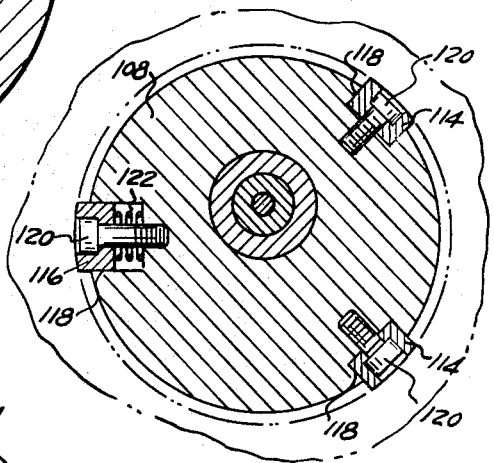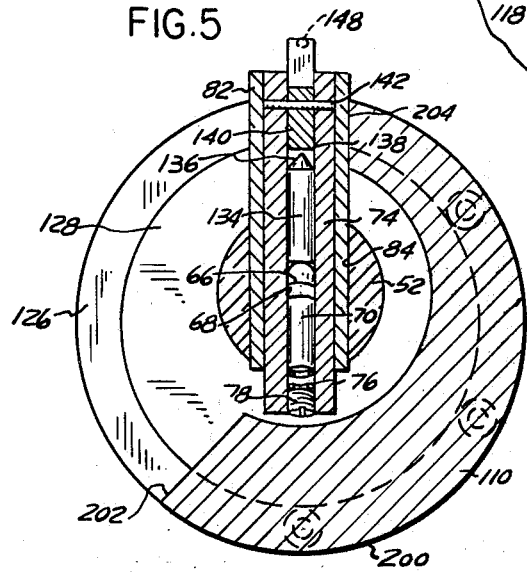

INVENTOR
ANDREW EISELE
BY Barthel & Bugbee
ATTORNEYS

United States Patent Office 3,497,961
Patented Mar. 3, 1970

3,497,961
RETRACTABLE DUAL-MEASUREMENT SINGLE-INDICATOR GAUGE FOR VARIABLE-WIDTH INTERNAL GROOVES
Andrew Eisele, 20460 Brookwood Ave., Dearborn Heights, Mich. 48127
Filed May 2, 1968, Ser. No. 726,104
Int. Cl. G01b 5/24
U.S. Cl. 33—174                      20 Claims

ABSTRACT OF THE DISCLOSURE

The axial widths of a tapered or stepped internal groove within a workpiece bore are measured at radially-spaced locations by this single-indicator gauge. Its measuring head is rotated by a rotary handle and has a forward pilot portion snugly engaging the workpiece bore and also has fixed and movable probes or feelers which can be retracted into and projected out of a circumferential recess in an eccentric rotary body in order to insert them and withdraw the feelers from the internal groove to be measured. Means is also provided for positioning the feelers at two different radial distances from the axis of the bore in order to measure the axial widths of the tapered or stepped groove at these two locations. Motion-transmitting mechanism converts the swinging motion of the movable feeler to axial motion of a rod which engages the plunger of a conventional dial indicator mounted in a rearwardly-located stationary handle which is optionally slidable relative to the rotary handle rotatably mounted therein.

Figure 7:
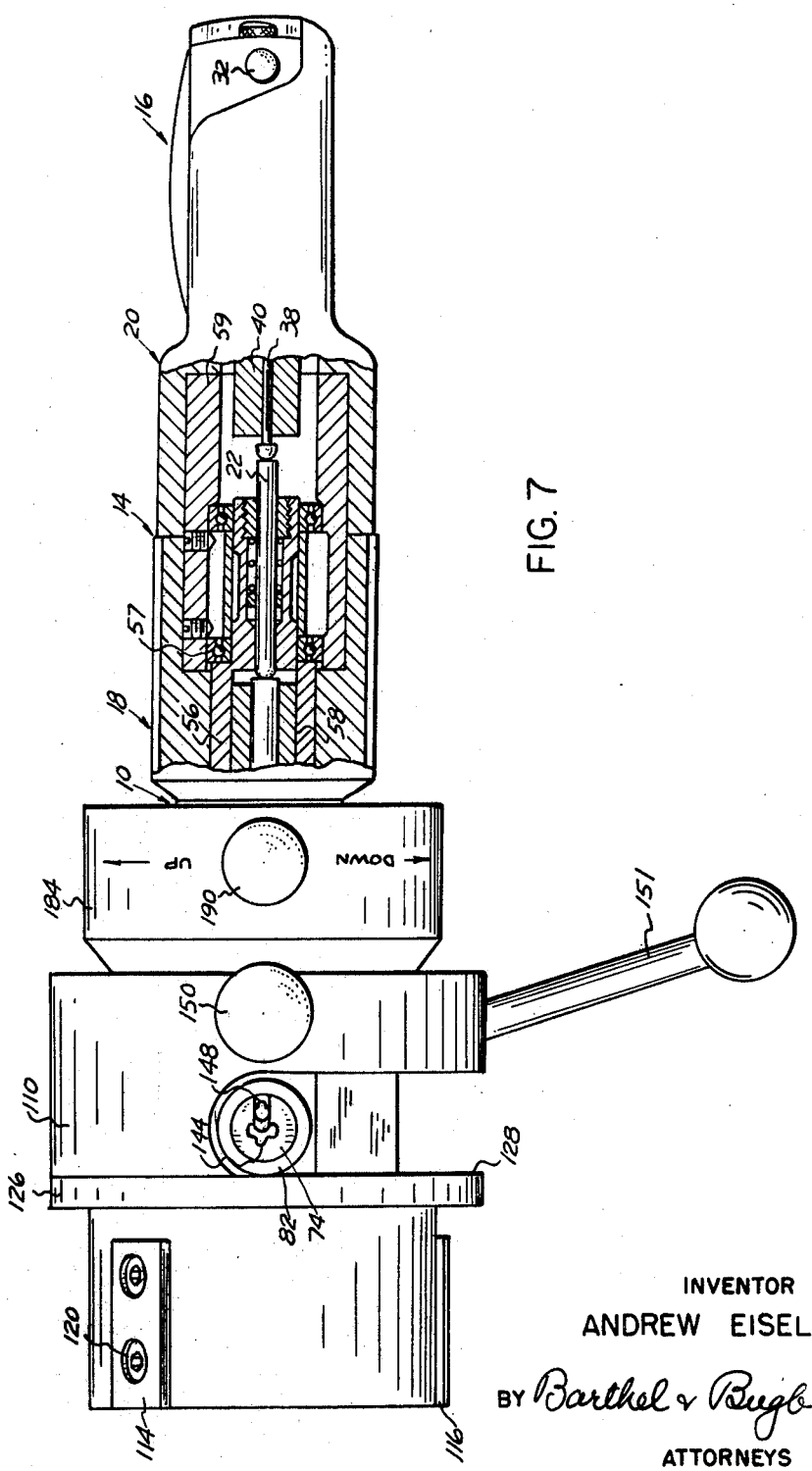

In the drawings:

FIGURE 1 is a central vertical section, partly in side elevation, of a retractable dual-measurement single-indicator gauge for variable-width internal grooves, according to one form of the invention;

FIGURES 2, 3, 4, 5 and 6 are cross-sections taken respectively along the lines 2—2, 3—3, 4—4, 5—5 and 6—6 in FIGURE 1;

FIGURE 7 is a top plan view, partly in longitudinal horizontal section, of the gauge shown in FIGURE 1; and FIGURE 8 is a fragmentary vertical section of the upper forward corner of FIGURE 1, but showing the gauge feelers measuring a stepped internal groove.

Referring to the drawings in detail, FIGURE 1 shows an internal groove-width measuring gauge, generally designated 10, as consisting generally of a measuring head 12 according to one form of the invention, which is removably held in a dial indicator holder 14 containing a dial indicator 16. The dial indicator holder 14 includes a rotary handle 18 which is rotatably mounted in a stationary handle 20 containing a reciprocable rearward motion-transmitting rod 22. The stationary handle 20 has a cup-shaped recess 24 receiving the casing 26 of the dial indicator 16, the bezel or rim 28 of which is adjustably rotatable theron. The rim 28 carries a graduated dial 30 and is adapted to be locked in its adjusted position by a clamping screw 32. The dial indicator 16 has the usual needle or pointer 34 mounted upon a rotary spindle 36 which is connected by conventional gearing to a reciprocable plunger 38 slidably mounted in the dial indicator stem and engaged by the rearward motion-transmitting rod 22.

The bore 42 (FIGURE 1) within which the rearward motion-transmitting rod 22 is reciprocably mounted within the rotary handle 18 is coaxial with a first longitudinal bore 44 relieved at 46 within the rearward cylindrical portion 48 and reduced diameter stem 50 of a hollow measuring head supporting shaft 52. The reduced diameter portion 50 of the shaft 52 is notched for locking engagement by a set screw 54 threaded through the rotary handle 18 and through a rotary sleeve 56 into its socket 58. The rotary sleeve 56 is rotatably mounted upon ball bearings 57 secured within a stationary sleeve 59. The shaft 52 contains a forward longitudinal motion-transmitting rod 60, the rearward end of which engages the rounded forward end of the rearward motion-transmitting rod 22. The forward motion-transmitting rod 60 is provided with a beveled forward end 62 which is inclined at angle of approximately 45 degrees to the axis 64 of the rod 60 and bores 44 and 46, and is engageable with the sharp upper edge 66 of a notch 68 in an inner transverse motion-transmitting pin 70. The pin 70 is reciprocably mounted in a transverse bore 72 which is inclined slightly to the axis of a reciprocable barrel 74 and is urged in an outward direction by a compression spring 76 mounted in the bore 72 and held in place by a set screw 78 threaded into the outer end thereof.

The barrel 74 (FIGURE 1) is of elongated cylindrical shape and is reciprocably mounted within a cylindrical bore 80 in a tubular member 82. The tubular member 82 and the barrel 74 have side openings 81 and 83 respective to receive the rod 60. The tubular member 82 is held immovable within a transverse bore 84 by being notched and engaged by a set screw 85 threaded through a longitudinal threaded bore 86 in the reduced diameter forward end 88 of the shaft 52. The barrel 74 and tubular member 82 collectively constitute a tubular structure 90. The set screw 85 in turn is engaged by the end of the threaded shank of a headed screw 92 also threaded into the bore 86. The head of the screw 92 is mounted in a counterbore 94 coaxial with the threaded bore 86 and containing a compression spring 96 which urges the shaft 52 forwardly within the measuring head 12. The counterbore 94 at its inner end opens into a smooth bore 98 coaxial with the threaded bore 86. The counterbore 94 and bore 98 are contained within and are coaxial with a collar 100, the tubular reduced diameter portion 102 of which is urged against the forward end of the shaft 52 while guided by the reduced diameter portion 90, thereof, which it surrounds.

The collar 100 is mounted eccentrically within a bore 104 (FIGURE 1) having an axis 106 and contained within the forward pilot portion 108 of a measuring head body 110. The pilot portion 108 has a cylindrical surface 112 coaxial with the axis 106 and adapted to fit into the bore B of the workpiece W having a counterbore C containing the tapered or stepped groove G, the axial width of which is to be measured at locations X and Y. The forward pilot portion 108 is snugly held within the workpiece bore B by two fixed shoes 114 (FIGURE 6) and a resiliently-urged movable shoe 116 secured within longitudinal grooves 118 spaced at equal circumferential intervals around the portion 108 by screws 120. The shoes 114 and 116 are of rectangular round-topped shape (FIGURE 7), and the movable shoe 116 is urged outward by two compression springs 122, only one of which is shown in FIGURE 6.

Bolted to the annular shoulder 124 between the body 110 and the forward pilot portion 108 is a contact ring 126 which engages the annular shoulder S between the workpiece bore B and counterbore C while the gauge 10 is in use. The body 110 adjacent the contact ring 126 is provied with a peripheral arcuate recess 128 in which the tubular member 82 is swingably mounted (FIGURE 5). The forward portion of the shaft 52 and the side wall of the tubular member 82 are bored and threaded in alignment to receive a pilot screw 130 (FIGURE 1), the tip of which extends into a longitudinal slot 132 to prevent rotation of the barrel 74 relative to the tubular member 82. The barrel 74 is bored longitudinally to receive an outer transverse motion-transmitting pin 134, the inner end of which engages the rounded outer end of the inner motion-transmitting pin 70, whereas the conical outer end 136 engages the sharp-edged notch 138 in a movable feeler 140 pivoted at 142 in the slotted outer end of the barrel 74 and having a rounded contact tip 144. The outer end of the barrel 74 adjacent the movable feeler 140 is provided with a fixed feeler 146 having a rounded contact tip 148. The contact tips 144 and 148 face in opposite directions to engage the opposite side walls of the workpiece groove G in order to measure the axial widths thereof at the locations X and Y.

To prevent the projecting feelers 140 and 146 from obstructing the insertion of the measuring head 12 fully into the workpiece bore B, the body 110 is rotated relative to the shaft 52 while the movable handle 18 is held stationary, so as to swing the tubular member 82 fully into the deep end of the arcuate recess 128 (FIGURE 5). This is accomplished by means of a handle bar 151 when the operator pulls outward on the knob 150 of a locking plunger 152. The locking plunger 152 (FIGURE 4) is reciprocably mounted in a radial counterbore 154 in a cylindrical plug 156 which in turn is annularly grooved and held in a radial bore 158 by a set screw 157 threaded into a threaded bore 159 (FIGURE 4) in the body 110. The upper part of the locking plunger 152 is of reduced diameter so as to pass through a bore 160 above which it is provided with a rib 162 which in the locked position of the plunger 152 interfits with a diametral notch 164 in the plug 156 and in its unlocked position rides on the top of the plug 156. The locking plunger 152 is urged downward to seat the rib 162 in the notch 164 by a compression spring 166 located in the upper part of the counterbore 154. The inner end of the plunger 152 is adapted to engage selectively either of two stop sockets 168 or 170 located approximately 135 degrees apart around the circumference of the shaft 52. The handle bar 151 is threaded obliquely into the body 110 (FIGURES 4 and 7).

To advance or retract the barrel 74 relative to the tubular member 82, the barrel 74 is provided with a cross slot 172 (FIGURE 1) engaged by an eccentric crank pin 174 projecting from the end of a rotary rod 176 journalled in a second relieved bore 178 in the shaft 52. Drivingly secured as by the set screw 179 to the rod 176 is a pinion 180 meshing with an internal ring gear 182 which in turn is press-fitted into an annular recess 183 in the forward end of a rotary collar 184 rotatably mounted upon the shaft 52, the shaft 52 and the collar 184 being suitably recessed to receive the pinion 180 and ring gear 182 respectively. The rod 176 is also drilled radially near its rearward end to receive the inner end of a stop pin 186 (FIGURES 1 and 2) which at the limits of a 180 degree rotation of the rod 176 is adapted to engage the opposite ends of a flat cutaway portion 188 on the lower side of the shaft 52. The collar 184 has a groove 189 therein to provide clearance (FIGURE 2) for this 180 degree swinging of the stop pin 186.

Rotation of the collar 184 and consequent rotation of the ring gear 182, and pinion 180 is accomplished by means of a knob 190 on the outer end of a grooved stem 192 held in position by a retaining screw 194 (FIGURE 1) within a radial bore 196 in the collar 184. The reduced diameter inner end of the stem 192 engages an annular groove 198 which prevents relative end motion between the collar 184 and shaft 52 while permitting relative rotary motion therebetween. The body 110 has an external generally cylindrical peripheral surface 200 coaxial with the axis 106 within which the tubular member 82 and the feelers 140 and 146 must be withdrawn into the arcuate recess 128 in order to prevent their obstructing the free insertion of the body 110 and its pilot portion 108 into the bore B and counterbore C of the workpiece W respectively.

In the operation of the retractable groove width measuring gauge 10 for measuring the axial widths of the tapered annular workpiece groove G at the radially-spaced locations X and Y respectively, let it be assumed that the feelers 140 and 146 are in their retracted positions (FIGURE 1) within the tubular member 82, but that the tubular member 82 happens to be in its advance location shown in FIGURES 1 and 5. To swing the body 110 so as to cause it to move the deep end 202 of its arcuate recess 128 adjacent the tubular member 82 and thus to remove it and the feelers 140 and 146 from possibly obstructing the insertion of the measuring head 12 within the workpiece bore B and counterbore C, the operator holds the rotary handle 18 stationary in one hand while he pulls outward upon the knob 150 to withdraw the inner end of the stem 152 from the socket 168 in the shaft 52 (FIGURE 4).

After pulling the knob 150 into its outer position and rotating it a quarter turn to cause the rib 162 to ride out of the notch 164 onto the top of the plug 156, he swings the handle bar 151 in a clockwise direction so as to rotate the body 110 relative to the shaft 52 until the inner end of the plunger 152 comes into alignment with the socket 170, whereupon he rotates the knob 150 another quarter turn so that the spring 166 urges the rib 162 into the notch 164 and the inner end of the plunger 152 into the socket 170, thereby locking the body 110 and shaft 52 in their thus-attained relative positions. As a result of this action, the deep end 202 of the arcuate recess 128 moves from the approximately seven o'clock position of FIGURE 5 to the approximately 12 o'clock position adjacent the left-hand side of the tubular member 82 so that the tips 144 and 148 of the feelers 140 and 146 lie in the recess 128 within the limit established by the circumferential surface 200 of the body 110. At the same time, the shallow end 204 of the recess 128 moves to an approximately five o'clock position.

The operator now pushes the pilot portion 108 of the measuring head 12 into the workpiece bore B, whereupon the round-topped shoes 114 and 116 engage and center the pilot portion 108 within the bore B and the tips 144 and 148 of the feelers 140 and 146 move into the counterbore C, with the spring 76 yielding sufficiently to permit slight inward motion of the feelers 140 and 146 as they pass into the counterbore C and push the pins 134 and 70 and the barrel 74 inward in so doing.

When the insertion of the measuring head 12 is halted by the engagement of the contact ring 126 with the annular workpiece shoulder S, the operator then withdraws the locking plunger 152 from the socket 170 (FIGURE 4) and rotates the body 110 in the reverse or counterclockwise direction by means of the handle bar 151 until the plunger 152 again comes opposite the socket 168 (FIGURE 4). As the result of this action, the shallow end 204 of the arcuate recess 128 again comes adjacent the tubular member 82 (FIGURE 5), whereupon the feeler tips 144 and 148 emerge from the arcuate recess 128 and the operator measures the width of the groove G at the inner location X, as shown by the dial indicator 16.

The operator now rotates the collar 184 by means of the knob 190 in a counterclockwise direction (FIGURE 2), consequently rotating the internal ring gear 182 and pinion 180 in a counterclockwise direction. The consequent counterclockwise rotation of the rod 176 and its crank pin 174 in the cross slot 172 of the barrel 74 pushes the barrel 74 radially outward in the bore 80 of the tubular member 82 while it is prevented from rotating by the tip of the pilot screw 130 within the longitudinal slot 132. This action causes the barrel 74 to move outward within the bore 80, thereby moving the tips 144 and 148 of the feelers 140 and 146 to their outer location Y. The operator then measures the width of the workpiece groove G at the outer location Y, as indicated by the dial indicator needle 34 upon the graduated dial 30 of the dial indicator 16 (FIGURE 1). The difference in the axial widths of the groove G between the locations X and Y thereby determines whether the groove dimensions lie within the specified tolerances. These measurements are preferably repeated at diametrically-opposite points X and Y in the groove G by rotating the measuring head 12 bodily by rotating the rotary handle 18 while holding the stationary handle 20 immovable so as to maintain the dial indicator 16 in the convenient viewing position.

Upon completion of these measurements, the operator loosens the thumb screw 61, pulls the stationary handle 20 backward to provide clearance for the subsequent rearward motion of the motion-transmitting rod 60 when the collar 184 is rotated in a clockwise direction by the knob 190 to similarly rotate the internal ring gear 182, pinion 180, rod 176 and stop pin 186 and retract the barrel 74 and its feelers 140 and 146 into the tubular member 82. By then pulling outward on the knob 150 and rotating it to lock the plunger 152 in its outer position, he then rotates the body 110 in a clockwise direction by means of the handle bar 151. In this manner he moves the deep end 202 of the arcuate recess 128 of the body 110 adjacent the end of the tubular member 82, with the feeler tips 144 and 148 within the circumference 200 of the body 110, whereupon the measuring head 12 is then capable of being withdrawn and is withdrawn by the operator from the workpiece bore B and counterbore C.

If, however, the dial indicator is of the different conventional type wherein its spindle 36 and needle 34 can rotate several revolutions, the number of which are indicated by a smaller needle on a smaller dial (like the second hand of a pocket watch upon its smaller dial), it becomes unnecessary to provide the groove 63 and locking thumb screw 61 or to slide the stationary handle 20 relatively to the rotary handle 18. In such instance, the dial indicator plunger 38 is itself capable of moving rearwardly the full amount of the reaward motion of the rod 60 during retraction of the barrel 74 and tubular member 82 into the body 110 of the measuring head 12.

I claim:

1. A retractable dual-measurement single-indicator gauge for measuring the widths of a variable-width internal groove within a workpiece bore at radially-spaced locations, said gauge comprising
   a stationary handle structure having thereon a dial indicator with a reciprocable operating plunger,
   a rotary handle structure rotatably connected to said stationary handle structure,
   a hollow shaft connected to said rotary handle structure and having a first longitudinal bore and a transverse bore communicating therewith,
   a measuring head body having an external peripheral surface and a pilot portion disposed coaxial therewith and adapted to project into the workpiece bore adjacent the internal groove to be measured,
      said body having therein a longitudinal bore with its axial disposed eccentric to the axis of said pilot portion and receiving said shaft for relative rotation therebetween,
      said body also having a circumferentially-elongated peripheral recess,
   a tubular structure mounted in said transverse bore and projecting through said peripheral recess beyond said external peripheral surface and having a side opening therein,
   a fixed feeler secured to said tubular structure near the outer end thereof,
   a movable feeler movably mounted in said tubular structure adjacent said fixed feeler,
   longitudinal motion-transmitting means reciprocably mounted in said first longitudinal bore in rearward engagement with said dial indicator operating plunger and projecting forwardly through said side opening into said tubular structure,
   motion-converting mechanism operatively connecting said movable feeler with said longitudinal motion-transmitting means,
   and means for rotating said body and shaft relative to one another for selectively moving said feelers into and out of said recess.

2. A retractable dual-measurement single-indicator gauge, according to claim 1, wherein said tubular structure includes a tubular member secured in said transverse bore and a barrel reciprocably mounted in said tubular member,
   said movable feeler and said motion-converting mechanism being mounted in said barrel,
   and wherein means is provided for reciprocating said barrel relative to said tubular member.

3. A retractable dual-measurement single-indicator gauge, according to claim 2, wherein said shaft has a second longitudinal bore therein, and wherein said reciprocating means includes a rotary rod rotatably mounted on said second bore and having an eccentric portion thereon reciprocatingly engaging said barrel.

4. A retractable dual-measurement single-indicator gauge, according to claim 3, wherein a collar is rotatably mounted on said shaft, and wherein gearing rotatingly connects said collar to said rotary rod.

5. A retractable dual-measurement single-indicator gauge, according to claim 1, wherein said rotating means also moves said tubular structure into and out of said recess.

6. A retractable dual-measurement single-indicator gauge, according to claim 5, wherein said recess is of arcuate configuration and is of different depths at its opposite ends.

7. A retractable dual-measurement single-indicator gauge, according to claim 6, wherein said rotating means includes a locking element movably mounted in said body,
   and wherein said shaft is provided with a pair of stop recesses disposed in circumferentially spaced relationship in said shaft and successively engageable by said locking element.

8. A retractable dual-measurement single-indicator gauge, according to claim 1, wherein spring means is provided for urging said shaft forwardly within said measuring head body.

9. A retractable dual-measurement single-indicator gauge, according to claim 2, wherein said means for rotating said measuring head body and said shaft relative to one another also moves said barrel into and out of said recess.

10. A retractable dual-measurement single-indicator gauge, according to claim 9, wherein said shaft has a second longitudinal bore therein, and wherein said reciprocating means includes a rotary rod rotatably mounted in said second bore and having an eccentric portion thereon reciprocatingly engaging said barrel.

11. A retractable dual-measurement single-indicator gauge, according to claim 1, wherein said stationary handle structure is adjustably movable longitudinally relatively to said rotary handle structure.

12. A retractable dual-measurement single-indicator gauge, according to claim 11, wherein one of said handle structures has a longitudinal guide slot therein,
   and wherein the other of said structures has a transverse projection slidably engaging said slot.

13. A retractable dual-measurement single-indicator gauge, according to claim 1, wherein said movable feeler is pivotally mounted in said tubular structure and has a contact portion thereon,
   and wherein said motion-converting mechanism includes a reciprocable element having a tapered portion engaging said contact portion whereby to convert rocking motion of said movable feeler into reciprocating motion of said element.

14. A retractable dual-measurement single-indicator gauge, according to claim 13, wherein said contact portion comprises a notch with a sharp edge,
and wherein said tapered portion is of conical configuration engaging said sharp edge.

15. A retractable dual-measurement single-indicator gauge, according to claim 3, wherein said shaft has a stop portion thereon,
and wherein said rotary rod has a stop element projecting laterally therefrom and engageable with said stop portion in response to rotation of said rotary rod.

16. A retractable dual-measurement single-indicator gauge, according to claim 15, wherein said stop portion comprises a flat cutaway portion on said shaft,
and wherein said stop element comprises a pin projecting radially from said rotary rod.

17. A retractable dual-measurement single-indicator gauge, according to claim 16, wherein said flat cutaway portion comprises a chordal surface extending across said shaft,
and wherein said stop element swings into engagement with said chordal surface at opposite limits of rotation of said rotary rod.

18. A retractable dual-measurement single-indicator gauge, according to claim 15, wherein a collar is rotatably mounted on said shaft,
wherein gearing rotatingly connects said collar to said rotary rod,
wherein said shaft has an arcuate peripheral groove therein,
and wherein said collar has a projection slidably engaging said groove.

19. A retractable dual-measurement single-indicator gauge, according to claim 18, wherein said collar has a recess therein aligned with said stop element,
and wherein said stop element swings through said recess in response to rotation of said rotary rod.

20. A retractable dual-measurement single-indicator gauge, according to claim 1, wherein said body-rotating means includes a handle bar secured thereto and projecting outwardly therefrom.

References Cited
UNITED STATES PATENTS

| | | | |
|---|---|---|---|
| 2,830,375 | 4/1958 | Zwayer | 33—174 |
| 3,343,269 | 9/1967 | Eisele | 33—174 |

SAMUEL S. MATTHEWS, Primary Examiner